US012641609B2

(12) United States Patent
Fakoorian et al.

(10) Patent No.: US 12,641,609 B2
(45) Date of Patent: May 26, 2026

(54) HIGH BAND FREQUENCY PUCCH CONFIGURATIONS

(71) Applicant: Apple Inc., Cupertino, CA (US)

(72) Inventors: Seyed Ali Akbar Fakoorian, San Diego, CA (US); Chunhai Yao, Beijing (CN); Chunxuan Ye, San Diego, CA (US); Dawei Zhang, Saratoga, CA (US); Haitong Sun, Saratoga, CA (US); Hong He, San Jose, CA (US); Huaning Niu, San Jose, CA (US); Oghenekome Oteri, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 18/260,381

(22) PCT Filed: Jan. 14, 2021

(86) PCT No.: PCT/CN2021/071911

§ 371 (c)(1),
(2) Date: Jul. 5, 2023

(87) PCT Pub. No.: WO2022/151257

PCT Pub. Date: Jul. 21, 2022

(65) Prior Publication Data

US 2024/0073905 A1     Feb. 29, 2024

(51) Int. Cl.
| | |
|---|---|
| *H04W 72/21* | (2023.01) |
| *H04L 5/00* | (2006.01) |
| *H04W 72/0453* | (2023.01) |

(52) U.S. Cl.
CPC ........... *H04W 72/21* (2023.01); *H04L 5/0051* (2013.01); *H04W 72/0453* (2013.01)

(58) Field of Classification Search
CPC .............. H04W 72/21; H04W 72/0453; H04L 5/0051; H04L 5/0094; H04L 5/0044; H04L 5/0053; H04L 5/0001; H04L 27/0006
See application file for complete search history.

(56) References Cited

U.S. PATENT DOCUMENTS

| | | | |
|---|---|---|---|
| 2018/0192417 A1* | 7/2018 | Yin | ......................... H04L 5/005 |
| 2018/0220414 A1 | 8/2018 | Yin et al. | |

(Continued)

FOREIGN PATENT DOCUMENTS

| | | |
|---|---|---|
| CN | 110603774 | 12/2019 |
| CN | 111955044 | 11/2020 |

OTHER PUBLICATIONS

Samsung, "Potential solutions and techniques for NR-U Operation", 3GPP TSG RAN WG1 Meeting #92, R1-1802014, Mar. 2, 2018, 7 sheets.

*Primary Examiner* — Brian D Nguyen
(74) *Attorney, Agent, or Firm* — Fay Kaplun & Marcin, LLP

(57) ABSTRACT

A base station configures a physical uplink control channel (PUCCH) for a user equipment (UE) operating in a frequency band above 52.6 GHz. The base station allocates a predetermined number of resource blocks (RBs) for a physical uplink control channel (PUCCH) transmission, wherein the predetermined number of RBs is greater than one RB, transmits a PUCCH configuration including the predetermined number of RBs to the UE and receives a PUCCH transmission based on the PUCCH configuration and including a data sequence and a DMRS sequence, wherein the PUCCH configuration results in a multiplexing of a plurality (Continued)

400 of UEs based on a plurality of demodulated reference signal (DMRS) sequences.

20 Claims, 4 Drawing Sheets

(56)             References Cited

U.S. PATENT DOCUMENTS

| | | | | |
|---|---|---|---|---|
| 2021/0185706 A1* | 6/2021 | Park | | H04W 72/23 |
| 2021/0321394 A1* | 10/2021 | Li | | H04W 72/0446 |
| 2022/0132496 A1* | 4/2022 | Lu | | H04W 72/21 |
| 2022/0248329 A1* | 8/2022 | Peng | | H04W 52/0216 |
| 2023/0276459 A1* | 8/2023 | Ouchi | | H04L 1/1854 |
| | | | | 370/329 |
| 2023/0291451 A1* | 9/2023 | Su | | H04L 1/08 |
| 2023/0327841 A1* | 10/2023 | Okano | | H04L 5/0026 |
| 2023/0328736 A1* | 10/2023 | Choi | | H04L 25/03343 |
| | | | | 370/330 |
| 2023/0354340 A1* | 11/2023 | Su | | H04L 5/0012 |
| 2023/0371029 A1* | 11/2023 | Yamamoto | | H04L 1/1861 |
| 2023/0397213 A1* | 12/2023 | Blankenship | | H04L 1/0073 |

* cited by examiner

400

Allocate N RBs for PUCCH — 405

Transmit PUCCH configuration to UE — 410

Receive PUCCH transmission — 415

HIGH BAND FREQUENCY PUCCH CONFIGURATIONS

TECHNICAL FIELD

This application relates generally to wireless communication, and in particular relates to High Band Frequency PUCCH Configurations.

A user equipment (UE) may establish a connection to at least one of a plurality of different networks or types of networks. When establishing the network connection such as, for example, a connection to a 5G new radio (NR) network, the UE may connect to the network through an unlicensed part of the spectrum. The 60 GHz and greater frequency band is generally referred to as the high band and there is a 23 dBm/MHz power spectral density (PSD) limit on the allowed transmission power at the UE.

SUMMARY

Some exemplary embodiments are related to a base station having a transceiver configured to communicate to a user equipment (UE) over a frequency band above 52.6 GHz and a processor communicatively coupled to the transceiver and configured to perform operations. The operations include allocating a predetermined number of resource blocks (RBs) for a physical uplink control channel (PUCCH) transmission, wherein the predetermined number of RBs is greater than one RB, transmitting a PUCCH configuration including the predetermined number of RBs to the UE and receiving a PUCCH transmission based on the PUCCH configuration and including a data sequence and a DMRS sequence, wherein the PUCCH configuration results in a multiplexing of a plurality of UEs based on a plurality of demodulated reference signal (DMRS) sequences.

Other exemplary embodiments are related to a base station having a transceiver configured to communicate to a user equipment (UE) over a frequency band above 52.6 GHz and a processor communicatively coupled to the transceiver and configured to perform operations. The operations include allocating a predetermined number of tones in the frequency domain for a physical uplink control channel (PUCCH) transmission, transmitting a PUCCH configuration including the predetermined number of tones to the UE and receiving a PUCCH transmission based on the PUCCH configuration and including a data sequence and a DMRS sequence, wherein the PUCCH configuration results in a multiplexing of a plurality of UEs based on a plurality of demodulated reference signal (DMRS) sequences.

Still other exemplary embodiments are related to a user equipment (UE) having a transceiver configured to communicate with a wireless network and a processor communicatively coupled to the transceiver and configured to perform operations. The operations include receiving a physical uplink control channel (PUCCH) configuration from a base station of the wireless network, wherein the PUCCH configuration includes a predetermined number of resource blocks (RBs) allocated for a PUCCH transmission, wherein the predetermined number of RBs is greater than one RB and transmitting a PUCCH transmission based on the PUCCH configuration and including a data sequence and a demodulated reference signal (DMRS) sequence, wherein the PUCCH configuration results in a multiplexing of the UE with one or more other UEs at based on a plurality of DMRS sequences.

DETAILED DESCRIPTION

Figure 1:
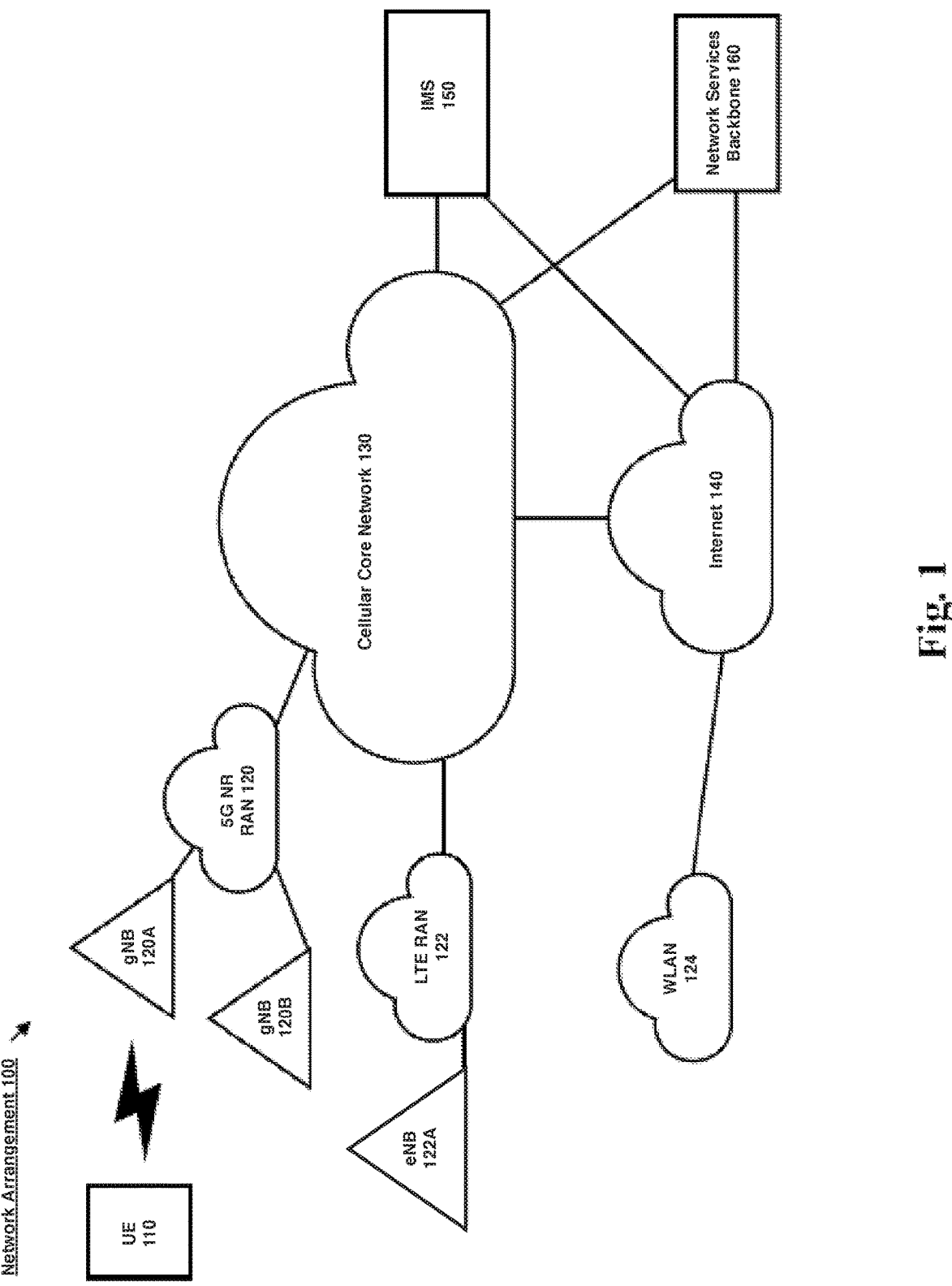
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to configuration and handling of physical uplink control channel (PUCCH) transmissions in 5G new radio (NR) wireless communications over an unlicensed frequency spectrum.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio NR radio access technology (RAT). However, in some embodiments, the network may also include a Long-Term Evolution (LTE) RAT even though the following description will focus primarily on 5G NR RAT.

As noted above, communications over the 60 GHz frequency band have a power spectral density (PSD) limitation of 60 dBm/MHz. To achieve a maximum effective isotropic radiated power (EIRP) under this restriction, resource blocks (RBs) in some uplink (UL) channels have been interlaced. The interlacing is at the RB level and a gap between sequential RBs within an interlace index is greater than 1 MHz. However, in the case of large subcarrier spacing (SCS) such as, for example, 120 kHz or greater, one RB allocation occupies more than 1 MHz. As such, interlacing is not necessary to achieve the maximum EIRP under the PSD limitation.

According to some exemplary embodiments, a base station (next generation-NodeB (gNB)) of a 5G NR network configures a plurality of consecutive RBs for PUCCH allocation over high band frequencies above 52.6 GHz at least for PUCCH Formats 0, 1, and 4, which presently only have an allocation of 1 PRB. As a result, a maximum EIRP under the PSD limitation is achieved without interlacing and UE separability is improved, thus allowing for more UEs to be multiplexed on overlapping RBs.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UE being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Thus, either simultaneously or alternatively, the UE 110 may connect to the 5G NR-RAN 120 via the gNBs 120A and 120B. In the present example, it may be considered that the gNB 120A is part of CG1 and the gNB 120B is part of CG2. Thus, in DC operation, the UE 110 may be simultaneously connected to gNB 120 A (CG1) and gNB 120B (CG2). Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
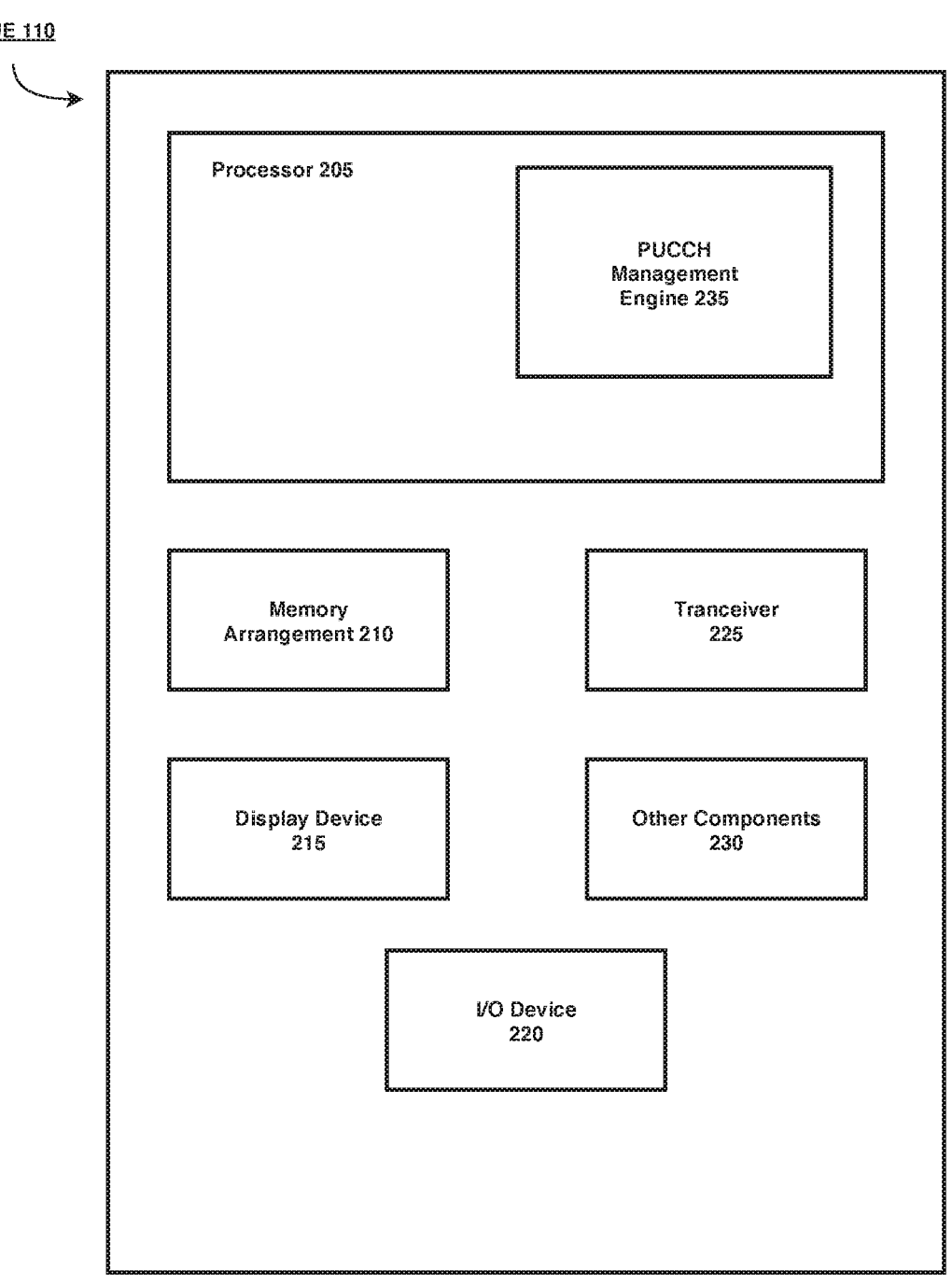
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a PUCCH engine 235. The PUCCH engine 235 may perform various operations related to transmission of PUCCHs on a frequency band above 52.6 GHz over RBs configured by the network.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
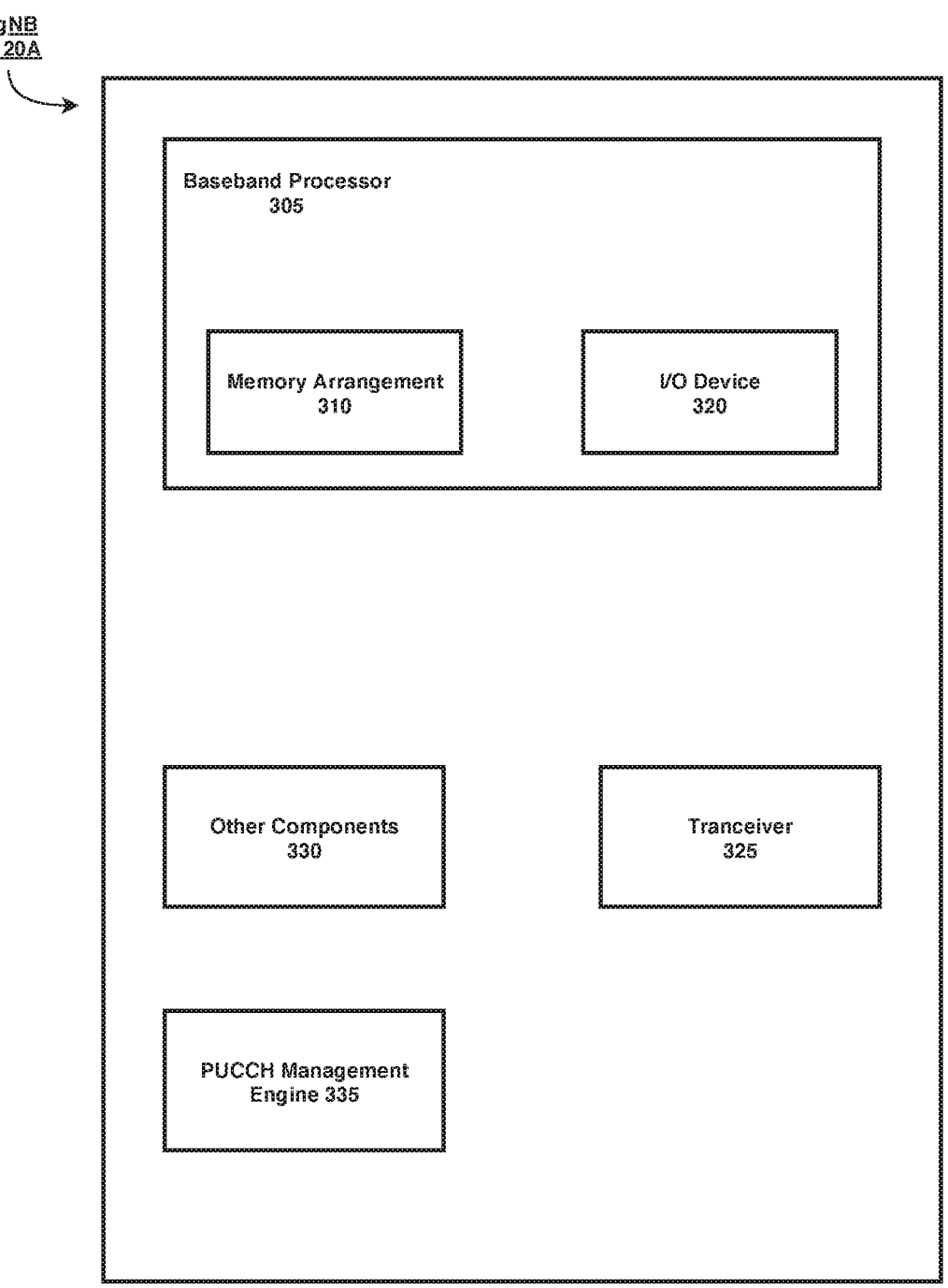
FIG. 3 shows an exemplary base station according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a PUCCH management engine 335 for performing operations including allocating a plurality of RBs for PUCCH transmission by the UE 110 over frequencies above 52.6 GHz and configuring a PUCCH that results in the multiplexing of PUCCH transmissions received from a plurality of UEs. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
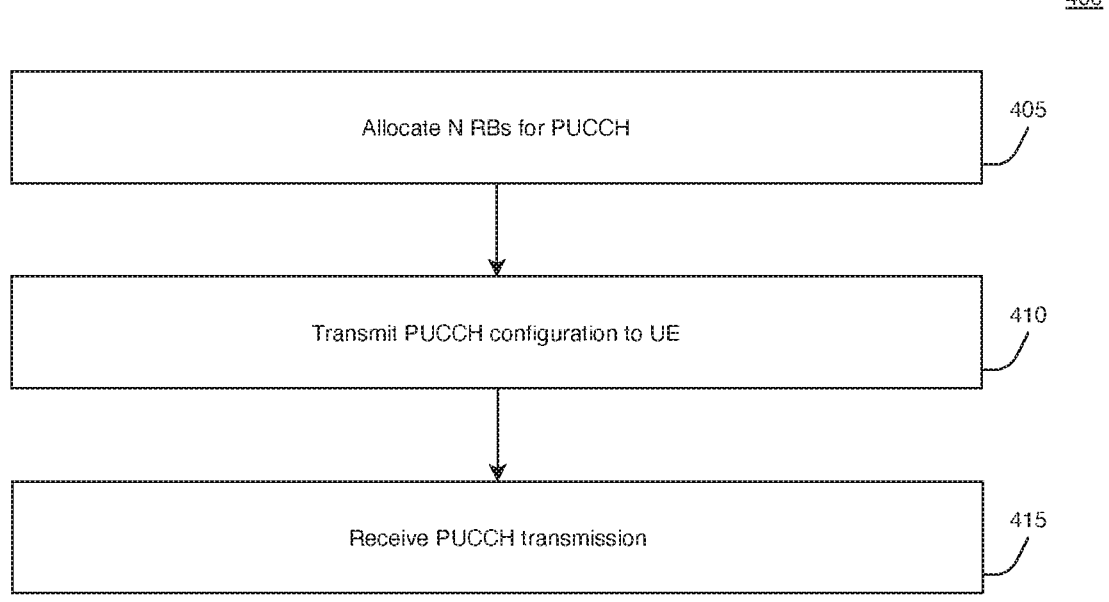
FIG. 4 shows a method of handling physical uplink control channel (PUCCH) transmissions according to various exemplary embodiments.

FIG. 4 shows a method 400 of handling PUCCH transmissions according to various exemplary embodiments. At 405, the gNB 120A (or 120B) allocates N RBs for a PUCCH configuration. In some embodiments, this allocation may be for PUCCH formats 0/1/4. In some embodiments, the value of N may be a fixed value determined by the gNB 120A. In some embodiments, the value of N may alternatively depend on a subcarrier spacing (SCS). For example, the larger the SCS is, the smaller the value of N is. When the value of N depends on the SCS, N is the minimum number of resource blocks for which the maximum EIRP is achieved without violating the PSD constraint. To find the minimum number of RBs per SCS to ensure a power level limited transmission is achieved, the following equation is used:

$$23 \text{ dBm/MHz} + 10 \log 10(N \text{ in MHz}) \geq \text{power limit}$$

where "power limit" is the EIRP. For a Format 4 PUCCH that uses a Discrete Fourier Transform (DFT) spreading waveform, if the N determined from the above equation is not equal to $2^{\alpha}$, $3^{\beta}$, and $5^{\gamma}$, where $\alpha$, $\beta$, and $\gamma$ are integers, then the number of RBs (N) is increased to the nearest allowed number of RBs.

In some embodiments, the value of N may alternatively be depend on a UE power class. For example, the larger a UE's transmission power capability is, the larger the value of N is. In some embodiments, the PUCCH allocation for all PUCCH formats may alternatively be a number of tones.

For PUCCH formats 2, 3, and 4, the maxCodeRate and nrofPRBs information elements (IEs) in the PUCCH configuration are used by the UE 110 to determine the number of RBs needed to transmit the PUCCH. The UE 110 uses the maxCodeRate and the uplink control information (UCI) payload size to determine this value, which cannot exceed the value indicated by nrofPRBs. In some embodiments, the gNB 120A does not configure the UE 110 with values of the maxCodeRate and nrofPRBs IEs that would result in the maximum permissible EIRP (under the PSD limitation) being achieved by the UE 110.

In some embodiments, the value of N indicates the number of repetitions in the frequency domain for the number of RBs determined by the UE 110 based on the maxCodeRate. For example, if the UE 110 determines that 3 RBs are needed to transmit the PUCCH and the value of N is 2, then the total number of RBs is 6. The UE 110 transmits the PUCCH on 3 RBs in the frequency domain and then repeats the PUCCH (again in the frequency domain).

At 410, the gNB 120A transmits the PUCCH configuration including the PUCCH RB allocation to the UE 110. In some embodiments, the PUCCH RB allocation may be indicated to the UE via higher layer signaling (e.g., radio resource control (RRC) signaling). In some embodiments, the PUCCH RB allocation may alternatively be indicated to the UE 110 dynamically via, for example, downlink control information (DCI).

The PUCCH configuration results in the multiplexing of a plurality of UEs based on their respective demodulated reference signal (DMRS) sequences. In some embodiments, because N RBs are now allocated for the PUCCH, the length of the DMRS sequence for the PUCCH configured by the gNB 120A for Formats 0, 1, and 4 may be N×12 symbols. The increased length of the DMRS sequence advantageously provides improved UE separability by the gNB 120A, which allows for more UEs to be multiplexed on overlapping RBs. In addition, the number of cyclic shifts (CS) and/or the length of an orthogonal cover code (OCC) applied to the DMRS sequence may also be increased. For example, current OCC length is presently 2 or 4. Because of the increase of the length of the DMRS sequence, in some embodiments, the OCC may have a length of 6, which allows for more CSs to be introduced as well.

In some embodiments, the DMRS sequence is repeated N times, where each RB may have the same or a different DMRS sequence with the same or a different CS. In some embodiments, a single DMRS sequence may alternatively span multiple RBs. In some embodiments, the N RBs may alternatively be divided into a plurality of blocks. In some embodiments, the plurality of blocks have the same number of RBs. In some embodiments, the plurality of blocks may alternatively have a different number of RBs. In some embodiments, each block has its own DMRS sequence length, Zadoff-Chu (ZC) root, and/or CS, which can be the same or different across all blocks. As such, UEs may be multiplexed with partial overlap in RBs as opposed to completely overlapping in all RBs. For example, if N=4 RBs and two blocks, each having 2 RBs, are configured, a first UE may be multiplexed over all 4 RBs (2 blocks) and a second UE may be multiplexed over 2 RBs (1 block). In such a case, separability is simplified at a receiver of the gNB 120A.

In some embodiments, to multiplex multiple UEs with partial overlapping, the gNB 120A may alternatively or additionally use interleaved frequency division multiple access (IFDMA). In such a scenario, different DMRSs associated with different UEs may be multiplexed on different comb indices (e.g., comb 2, comb 4, etc.) to ensure that the DMRS sequences are orthogonal at the gNB 120A (the receiver). In some embodiments, the gNB 120A may utilize this IFDMA multiplexing method in addition to the division of the N RBs into multiple blocks to allow more UEs to be multiplexed together.

In some embodiments, for PUCCH formats 2 and 3, the PUCCH configuration received from the gNB 120A may result in the multiplexing of the UEs as described above for Formats 0, 1, and 4, but with an interlaced structure where each interlace has 10 RBs. In such a scenario, for Format 3, different UEs may have a different CS value ($m_0$) of 0, 3, 6, or 9. For Format 2, an OCC length of 2 or 4 may be used.

At 415, the gNB 120A receives the PUCCH transmission including the DMRS sequence and the data sequence from the UE(s) 110. In some embodiments, for Format 4 PUCCHs with N RBs, the UE 110 maps the data sequence over N×12 tones (similar to the DMRS sequence). In some embodiments, the data sequence may alternatively be mapped over RBs, where the sequence is mapped to one RB and then repeated for the remainder of the N RBs. In some embodiments, the DMRS sequence may have been over the entire N RB allocation (as noted above) whereas the data sequence is mapped to one RB and then repeated for the remainder of the N RBs. Alternatively, the DMRS may be mapped to one RB and repeated for the remainder of the N RBs whereas the data sequence is mapped over the entire N RB allocation.

In some embodiments, PUCCH Format 0 or 1 transmissions may include an increased number of UCI bits since the number of RBs is now greater than 1 (N RBs). In such a scenario, the UCI bits may be mapped into sequences. In some embodiments, the number of UCI bits may depend on the number of RBs (N) and the number of UEs multiplexed on the same set of RBs.

In some embodiments, for PUCCH Format 4 transmissions, the maximum number of UCI and cyclic redundancy check (CRC) bits of 115 bits may be relaxed because the increase in RBs from 1 to N means that more UCI bits may now be carried. As such, the number of UCI and CRC bits may be increased to up to N×115 bits.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

EXAMPLES

In a first example, a processor of a base station is configured to perform operations comprising allocating a predetermined number of resource blocks (RBs) for a physical uplink control channel (PUCCH) transmission, wherein the predetermined number of RBs is greater than one RB, transmitting a PUCCH configuration including the predetermined number of RBs to the UE, and receiving a PUCCH transmission based on the PUCCH configuration and including a data sequence and a DMRS sequence, wherein the PUCCH configuration results in a multiplexing of a plurality of UEs based on a plurality of demodulated reference signal (DMRS) sequences.

In a second example, the processor of the first example, wherein the PUCCH transmission is one of a Format 0 PUCCH transmission, a Format 1 PUCCH transmission, or a Format 4 PUCCH transmission.

In a third example, the processor of the second example, wherein the predetermined number of RBs is configured via higher layer signaling to the UE.

In a fourth example, the processor of the second example, wherein the predetermined number of RBs is dynamically indicated to the UE.

In a fifth example, the processor of the second example, wherein the predetermined number of RBs is based on at least one of a subcarrier spacing and a UE power class.

In a sixth example, the processor of the second example, wherein a number of symbols of a DMRS sequence length may be a product of the predetermined number and 12.

In a seventh example, the processor of the second example, wherein the DMRS sequence for each UE is repeated on a per RB basis for the predetermined number of RBs.

In an eighth example, the processor of the second example, wherein the DMRS sequence for each UE spans the predetermined number of RBs.

In a ninth example, the processor of the second example, wherein the operations further comprise dividing the predetermined number of RBs into multiple blocks, wherein the plurality of UEs are multiplexed on different ones of the multiple blocks, and wherein each block includes a corresponding one of a DMRS sequence length, a Zadoff-Chu (ZC) root, and a cyclic shift (CS).

In a tenth example, the processor of the second example, wherein the plurality of UEs are multiplexed based on an interleaved frequency division multiple access (IFDMA)-based DMRS, and wherein IFDMA-based DRMS sequences associated with different UEs are multiplexed on different comb indices.

In an eleventh example, the processor of the first example, wherein the PUCCH transmission is one of a Format 2 PUCCH transmission, a Format 3 PUCCH transmission, or a Format 4 PUCCH transmission.

In a twelfth example, the processor of the eleventh example, wherein the PUCCH configuration includes a maxCodeRate information element (IE) and a nrofPRBs IE, and wherein the base station does not configure the maxCodeRate IE and nrofPRBs IE which results in a maximum effective isotropic radiated power (EIRP) at the UE not being achieved.

In a thirteenth example, the processor of the eleventh example, wherein the PUCCH configuration includes a maxCodeRate information element (IE) and a nrofPRBs IE, and wherein the predetermined number of RBs is based on scaling a number of RBs determined by the UE based on a maxCodeRate and an uplink control information (UCI) transmission payload size by a scaling factor.

In a fourteenth example, the processor of the eleventh example, wherein a value of a cyclic shift (CS) for each DMRS is 0, 3, 6, or 9 for Format 3 PUCCH transmissions, and wherein a length of an orthogonal cover code (OCC) applied to each DMRS is 2 or 3 for Format 2 PUCCH transmissions.

In a fifteenth example, the processor of the first example, wherein when the PUCCH transmission is a Format 4 PUCCH having the predetermined number of RBs, the DMRS sequence and a data sequence for each UE is repeated on a per RB basis for the predetermined number of RBs.

In a sixteenth example, the processor of the first example, wherein when the PUCCH transmission is a Format 4 PUCCH having the predetermined number of RBs, the DMRS sequence and a data sequence for each UE spans the predetermined number of RBs.

In a seventeenth example, the processor of the first example, wherein when the PUCCH transmission is a Format 4 PUCCH having the predetermined number of RBs, the DMRS sequence for each UE spans the predetermined number of RBs, and wherein a data sequence is repeated on a per RB basis for the predetermined number of RBs.

In an eighteenth example, the processor of the first example, wherein when the PUCCH transmission is a Format 4 PUCCH having the predetermined number of RBs, a total number of bits for both uplink control information (UCI) and cyclic redundancy check (CRC) is less than or equal to the product of the predetermined number and 115.

In a nineteenth example, the processor of the first example, wherein the predetermined number of RBs is configured to maximize an effective isotropic radiated power (EIRP) of the PUCCH transmission at the UE while complying with a predetermined power spectral density (PSD) limitation.

In a twentieth example, a processor of a base station is configured to perform operations comprising allocating a predetermined number of tones in the frequency domain for a physical uplink control channel (PUCCH) transmission, transmitting a PUCCH configuration including the predetermined number of tones to the UE, and receiving a PUCCH transmission based on the PUCCH configuration and including a data sequence and a DMRS sequence, wherein the PUCCH configuration results in a multiplexing of a plurality of UEs based on a plurality of demodulated reference signal (DMRS) sequences.

In a twenty-first example, a processor of a user equipment (UE) is configured to perform operations comprising receiving a physical uplink control channel (PUCCH) configuration from a base station of the wireless network, wherein the PUCCH configuration includes a predetermined number of resource blocks (RBs) allocated for a PUCCH transmission, wherein the predetermined number of RBs is greater than one RB, and transmitting a PUCCH transmission based on the PUCCH configuration and including a data sequence and a demodulated reference signal (DMRS) sequence, wherein the PUCCH configuration results in a multiplexing of the UE with one or more other UEs at based on a plurality of DMRS sequences.

In a twenty-second example, the processor of the twenty-first example, wherein the PUCCH transmission is one of a Format 0 PUCCH transmission, a Format 1 PUCCH transmission, or a Format 4 PUCCH transmission.

In a twenty-third example, the processor of the twenty-second example, wherein the predetermined number of RBs is based on at least one of a subcarrier spacing and a UE power class.

In a twenty-fourth example, the processor of the twenty-second example, wherein a number of symbols of a DMRS sequence length may be a product of the predetermined number and 12.

In a twenty-fifth example, the processor of the twenty-second example, wherein the DMRS sequence is repeated on a per RB basis for the predetermined number of RBs.

In a twenty-sixth example, the processor of the twenty-second example, wherein the DMRS sequence spans the predetermined number of RBs.

In a twenty-seventh example, the processor of the twenty-first example, wherein the PUCCH transmission is one of a Format 2 PUCCH transmission, a Format 3 PUCCH transmission, or a Format 4 PUCCH transmission.

In a twenty-eighth example, the processor of the twenty-seventh example, wherein the PUCCH configuration includes a maxCodeRate information element (IE) and a nrofPRBs IE, and wherein the operations further comprise determining a number of RBs based on a maxCodeRate and an uplink control information (UCI) transmission payload size, wherein the predetermined number of RBs is based on a scaling the number of RBs determined.

In a twenty-ninth example, the processor of the twenty-first example, wherein when the PUCCH transmission is a Format 4 PUCCH having the predetermined number of RBs, a total number of bits for both uplink control information (UCI) and cyclic redundancy check (CRC) is less than or equal to the product of the predetermined number and 115.

In a thirtieth example, the processor of the twenty-first example, wherein the predetermined number of RBs is configured to maximize an effective isotropic radiated power (EIRP) of the PUCCH transmission at the UE while complying with a predetermined power spectral density (PSD) limitation.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above-described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A base station, comprising:
a transceiver configured to communicate to a user equipment (UE) over a frequency band above 52.6 GHz; and
a processor communicatively coupled to the transceiver and configured to perform operations comprising:
allocating a predetermined number of resource blocks (RBs) for a physical uplink control channel (PUCCH) transmission configured as a Format 0 PUCCH transmission over the frequency band above 52.6 GHz, wherein the predetermined number of RBs is greater than one RB;
transmitting, to the UE via radio resource control (RRC) signaling, a PUCCH configuration including the predetermined number of RBs for the Format 0 PUCCH transmission; and
receiving a PUCCH transmission based on the PUCCH configuration and including a data sequence and a DMRS sequence,
wherein the PUCCH configuration results in a multiplexing of a plurality of UEs based on a plurality of demodulated reference signal (DMRS) sequences.

2. The base station of claim 1, wherein the predetermined number of RBs is configured via higher layer signaling to the UE.

3. The base station of claim 1, wherein the predetermined number of RBs is dynamically indicated to the UE.

4. The base station of claim 1, wherein the predetermined number of RBs is based on at least one of a subcarrier spacing and a UE power class.

5. The base station of claim 1, wherein a number of symbols of a DMRS sequence length is a product of the predetermined number of RBs and 12.

6. The base station of claim 1, wherein the DMRS sequence for each UE is repeated on a per RB basis for the predetermined number of RBs.

7. The base station of claim 1, wherein the DMRS sequence for each UE spans the predetermined number of RBs.

8. The base station of claim 1, wherein the operations further comprise:

dividing the predetermined number of RBs into multiple blocks, wherein the plurality of UEs are multiplexed on different ones of the multiple blocks, and wherein each block includes a corresponding one of a DMRS sequence length, a Zadoff-Chu (ZC) root, and a cyclic shift (CS).

9. The base station of claim 1, wherein the plurality of UEs are multiplexed based on an interleaved frequency division multiple access (IFDMA)-based DMRS, and wherein IFDMA-based DRMS sequences associated with different UEs are multiplexed on different comb indices.

10. The base station of claim 1, wherein the predetermined number of RBs is configured to maximize an effective isotropic radiated power (EIRP) of the PUCCH transmission at the UE while complying with a predetermined power spectral density (PSD) limitation.

11. A base station, comprising:

a transceiver configured to communicate to a user equipment (UE) over a frequency band above 52.6 GHz; and a processor communicatively coupled to the transceiver and configured to perform operations comprising:

allocating a predetermined number of tones in the frequency domain for a physical uplink control channel (PUCCH) transmission;

transmitting a PUCCH configuration including the predetermined number of tones to the UE; and receiving a PUCCH transmission based on the PUCCH configuration and including a data sequence and a DMRS sequence, wherein the PUCCH configuration results in a multiplexing of a plurality of UEs based on a plurality of demodulated reference signal (DMRS) sequences.

12. A method, comprising:

at a base station:

allocating a predetermined number of resource blocks (RBs) to a user equipment (UE) for a physical uplink control channel (PUCCH) transmission configured as a Format 1 PUCCH transmission over a frequency band above 52.6 GHz, wherein the predetermined number of RBs is greater than one RB;

transmitting, to the UE via radio resource control (RRC) signaling, a PUCCH configuration including the predetermined number of RBs for the Format 1 PUCCH transmission; and receiving a PUCCH transmission based on the PUCCH configuration and including a data sequence and a DMRS sequence, wherein the PUCCH configuration results in a multiplexing of a plurality of UEs based on a plurality of demodulated reference signal (DMRS) sequences.

13. The method of claim 12, wherein the predetermined number of RBs is configured via higher layer signaling to the UE.

14. The method of claim 12, wherein the predetermined number of RBs is dynamically indicated to the UE.

15. The method of claim 12, wherein the predetermined number of RBs is based on at least one of a subcarrier spacing and a UE power class.

16. The method of claim 12, wherein a number of symbols of a DMRS sequence length may be a product of the predetermined number and 12.

17. The method of claim 12, wherein the DMRS sequence for each UE is repeated on a per RB basis for the predetermined number of RBs.

18. The method of claim 12, wherein the DMRS sequence for each UE spans the predetermined number of RBs.

19. The method of claim 12, further comprising:

dividing the predetermined number of RBs into multiple blocks, wherein the plurality of UEs are multiplexed on different ones of the multiple blocks, and wherein each block includes a corresponding one of a DMRS sequence length, a Zadoff-Chu (ZC) root, and a cyclic shift (CS).

20. The method of claim 12, wherein the plurality of UEs are multiplexed based on an interleaved frequency division multiple access (IFDMA)-based DMRS, and wherein IFDMA-based DRMS sequences associated with different UEs are multiplexed on different comb indices.

* * * * *